US007354521B2

(12) United States Patent
Park et al.

(10) Patent No.: US 7,354,521 B2
(45) Date of Patent: Apr. 8, 2008

(54) METHOD OF FABRICATING INKJET PRINT HEAD USING PHOTOCURABLE RESIN COMPOSITION

(75) Inventors: Byung-Ha Park, Suwon-si (KR); Jong-Jin Park, Guri-si (KR); Young-Ung Ha, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/210,909

(22) Filed: Aug. 25, 2005

(65) Prior Publication Data

US 2006/0060561 A1 Mar. 23, 2006

(30) Foreign Application Priority Data

Sep. 23, 2004 (KR) ...................... 10-2004-0076670

(51) Int. Cl.
*G01D 15/00* (2006.01)
*G11B 5/127* (2006.01)

(52) U.S. Cl. ........................................... 216/27; 216/40

(58) Field of Classification Search .................. 216/27, 216/40

See application file for complete search history.

(56) References Cited

U.S. PATENT DOCUMENTS

| | | | | |
|---|---|---|---|---|
| 4,688,052 A * | 8/1987 | Inamoto et al. | | 347/65 |
| 5,478,606 A | 12/1995 | Okhuma et al. | | |
| 5,730,889 A * | 3/1998 | Miyagawa et al. | | 216/27 |
| 6,045,977 A * | 4/2000 | Chandross et al. | | 430/311 |
| 6,140,025 A * | 10/2000 | Imai et al. | | 430/325 |
| 2004/0147715 A1* | 7/2004 | Ishii et al. | | 528/408 |

FOREIGN PATENT DOCUMENTS

| | | |
|---|---|---|
| JP | 2003-212856 | 7/2003 |
| JP | 2003-344993 | 12/2003 |
| KR | 95-1419 | 3/1995 |
| KR | 2003-0077553 | 10/2003 |

OTHER PUBLICATIONS

Weit et al. (Chemistry of Materials, 4(2), 1992, pp. 453-457).*
Jensen et al. (Chemistry of Materials, 14(2), 2002, pp. 918-923).*
Okamura et al. (Journal of Photopolymer Sci. and Tech., 15(1), 2002, pp. 145-152).*
Urankar et al. (Chemistry of Materials, 9(12), 1997, pp. 2861-2868).*
S. Wolf and R.N. Tauber, (Silicon Processing for the VLSI Era, vol. 1—Process Technology, Lattice Press, 1986)(p. 469).*

* cited by examiner

*Primary Examiner*—Nadine Norton
*Assistant Examiner*—Mahmoud Dahimene
(74) *Attorney, Agent, or Firm*—Staas & Halsey LLP

(57) ABSTRACT

A method of fabricating an inkjet print head includes forming at least one energy generating element to eject ink on a substrate. A chamber layer and a nozzle layer are formed on the substrate, wherein the nozzle layer has a nozzle corresponding to the energy generating elements, and at least one of the chamber layer and the nozzle layer is formed using a photocurable resin composition that includes a photo-base generator, an epoxy resin and a non-photoreactive solvent.

11 Claims, 4 Drawing Sheets

METHOD OF FABRICATING INKJET PRINT HEAD USING PHOTOCURABLE RESIN COMPOSITION

CROSS-REFERENCE TO RELATED APPLICATIONS

This application claims the benefit of Korean Patent Application No. 2004-76670, filed on Sep. 23, 2004, the disclosure of which is hereby incorporated herein by reference in its entirety.

BACKGROUND OF THE INVENTION

1. Field of the Invention

The present invention relates to a method of fabricating an inkjet print head and, more particularly, to a method of fabricating an inkjet print head using a photocurable resin composition.

2. Description of the Related Art

An inkjet printer is an apparatus for printing an image by ejecting minute droplets of ink at a desired position on a recording medium, which is widely used because of an inexpensive price and capability of printing many kinds of colors at a high resolution.

This inkjet printer includes an inkjet head and an ink reservoir connected to the inkjet head. The inkjet head includes a chamber plate defining an ink flow path and an ink chamber, a heating resistor located in the ink chamber and a nozzle layer having a nozzle located corresponding to the heating resistor. The ink stored in the ink reservoir passes through an ink feed port to flow along the ink flow path, and is supplied into the ink chamber. When a current is supplied to the heating resistor, the heating resistor generates heat. The heat generates bubbles in the ink supplied into the ink chamber. The bubbles expand to apply pressure to the ink filled in the ink chamber. The ink is ejected by the pressure through the nozzle.

To secure reliable and stable operation, the inkjet printer must meet with various requirements. Above all, the chamber layer and the nozzle layer come into contact with an aqueous material, i.e., the ink at all times, so that they must have corrosion resistance against the ink as well as high mechanical strength to serve as a structure. Furthermore, the two layers must have an effective adhesive characteristic with respect to a substrate.

To meet these requirements, research intended to form the chamber layer and the nozzle layer using a photocurable resin composition is in progress. For example, according to U.S. Pat. No. 5,478,606, an ink flow path and an ink ejection outlet are formed by forming a photosensitive coating resin layer using a solution containing an epoxy resin and a cationic photopolymerization initiator. The cationic photopolyerization initiator is exposed to generate cations. The cations initiate polymerization of the epoxy resin. In the process of forming the photosensitive coating resin layer, when the cations are brought into contact with a heating resistor, which is generally formed of a metal, the heating resistor may be damaged. Therefore, before forming the photosensitive coating resin layer, a passivation layer should be formed on the heating resistor.

SUMMARY OF THE INVENTION

To solve the foregoing and/or other problems, it is an aspect of the present invention to provide a method of manufacturing an inkjet print head, including forming a chamber layer and/or a nozzle layer having a high adhesive force and a high mechanical strength with respect to a base substrate and corrosion resistance against ink by using a photocurable resin composition causing no damage to a heating resistor.

The foregoing and/or other aspects of the present invention may be achieved by providing a method of fabricating an inkjet print head. The method includes forming at least one energy generating element to eject ink on a substrate. A chamber layer and a nozzle layer are formed on the substrate, wherein the nozzle layer has a nozzle corresponding to the energy generating element, and wherein at least one of the chamber layer and the nozzle layer is formed using a photocurable resin composition containing a photo-base generator, an epoxy resin and a non-photoreactive solvent.

According to an aspect of the present invention, the photocurable resin composition may further include an ethylenically unsaturated compound.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
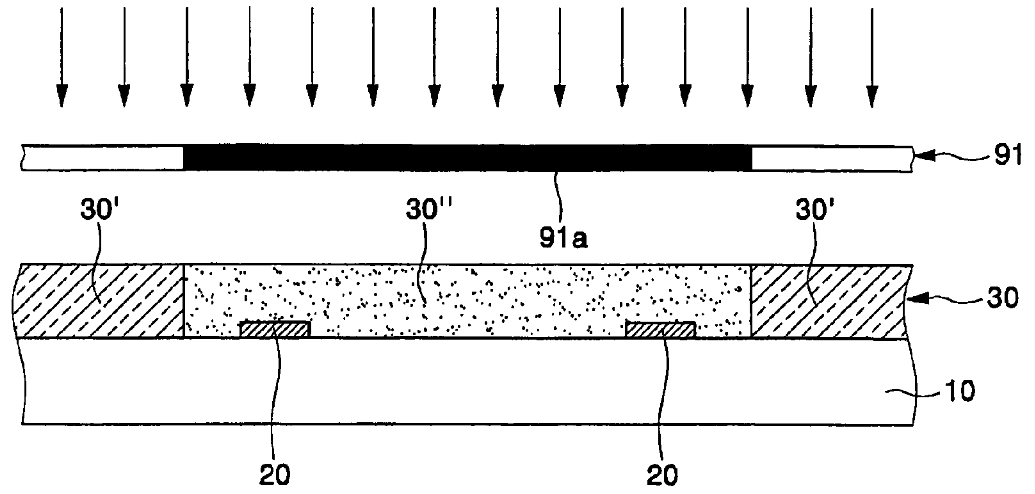
FIGS. 1A to 1E are cross-sectional views illustrating operations of a method of fabricating an inkjet print head according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIGS. 1A to 1E are cross-sectional views showing operations of a method of manufacturing an inkjet print head according to one embodiment of the present invention.

Referring to FIG. 1A, at least one energy generating element 20 for ink ejection is formed on a base substrate 10. In view of mass production, the base substrate 10 is, preferably, a silicon substrate having a thickness of about 500 μm. The energy generating element 20 may be a thermal resistor or piezoelectric element. Moreover, the thermal resistor may include a pattern consisting of a high-resistance metal layer and a low-resistance metal layer coming into contact with both ends of the high-resistance metal layer. The high-resistance metal layer may be a tantalum-aluminum alloy layer, while the low-resistance metal layer may be a gold layer. To protect lower structures including the energy generating element 20, a passivation layer (not shown) may be formed on the energy generating element 20. By the following reason, the passivation layer may not be formed.

A first photocurable resin layer 30 is formed on the substrate having the energy generating element 20. The first photocurable resin layer 30 may be formed by coating a photocurable resin composition using a spin-coating method, a roll coating method, or so forth. The photocurable resin composition contains a photo-base generator (PBG), an epoxy resin, and a non-photo-reactive solvent.

The PBG is a photoinitiator capable of generating a base by exposure. The base generated by exposure, preferably, is ammonia or amine. The ammonia or amine is capable of curing the epoxy resin.

The PBG may be at least one compound selected from a group consisting of cobalt-amine salts, alkyl amine salts, O-acyloximes, benzyloxycarbonyl derivatives, o-nitrobenzyloxycarbonyl derivatives and formamides.

The cobalt-amine salt compound may be one expressed by the following Formula 1.

$$Co(NH_2R)_5X^{2+}$$ Formula 1 where X is a halogen, and R is a hydrogen or an alkyl group having a carbon number between 1 and 5. Moreover, the halogen may be bromine (Br) or chlorine (Cl), and the alkyl group having a carbon number between 1 and 5 may be a methyl group or a propyl group.

This alkyl amine salt compound may be one expressed by the following Formula 2.

Formula 2

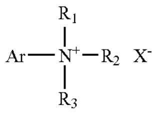

where Ar is an aromatic group, and $R_1$, $R_2$ and $R_3$ are independently alkyl groups having a carbon number between 1 and 5, or a bicyclo alkyl group in which $R_1$, $R_2$ and $R_3$ are interconnected and have a carbon number between 6 and 12.

Examples of this alkyl amine salt compound are expressed by the following Formulas 3 and 4.

Formula 3

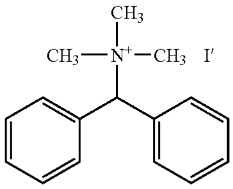

Formula 4

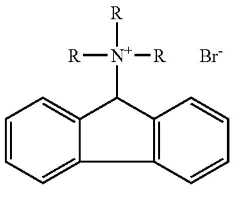

In Formula 4, $R_3N$ may be $(CH_3)_2C_2H_5N$, $(C_2H_5)_3N$, $(CH_3)_2C_3H_7N$,

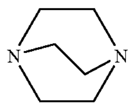

or

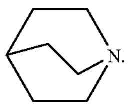

The O-acyloxime compound may be one expressed by Formula 5.

Formula 5

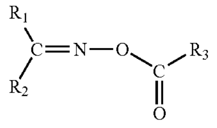

where $R_1$ and $R_2$ are independently aromatic groups or alkyl groups having a carbon number between 1 and 5, and $R_3$ is selected from the group consisting of an alkyl group having a carbon number between 1 and 5, a phenyl group, a benzyl group, an anilinyl group and a cyclohexylamineyl group.

Examples of this O-acyloxime compound are expressed by the following Formulas 6 to 9.

Formula 6

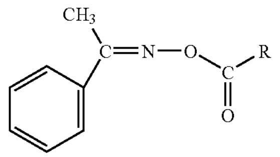

where R is selected from the group consisting of a benzyl group, an anilinyl group, a cyclohexylamineyl group, a t-butyl group and a phenyl group.

Formula 7

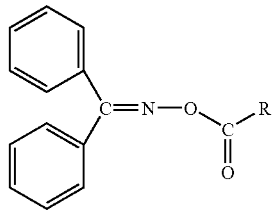

where R is selected from the group consisting of a benzyl group, an anilinyl group and a cyclohexylamineyl group.

Formula 8

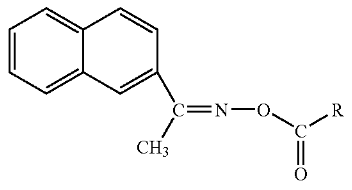

where R is selected from the group consisting of a benzyl group, an anilinyl group and a cyclohexylamineyl group.

Formula 9

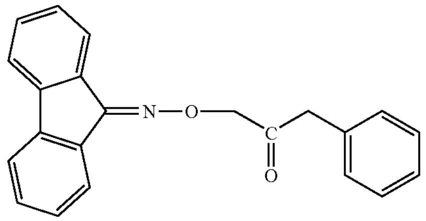

In addition, the O-acyloxime compound may be expressed by Formula 10 or 11.

Formula 10

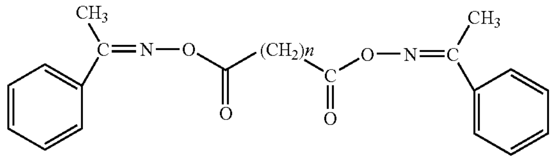

where n is 2 or 3

Formula 11

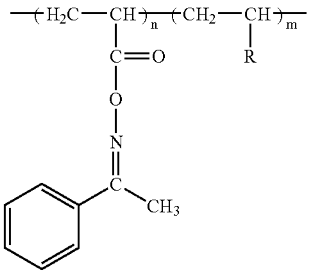

where R is a phenyl group or a benzophenoneyl group, the sum of n and m is 1.

The benzyloxycarbonyl derivative may be a compound expressed by the following Formula 12.

Formula 12

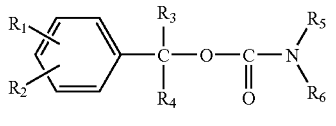

where $R_1$ and $R_2$ are independently hydrogen or alkoxy groups having a carbon number between 1 and 5, $R_3$ and $R_4$ are independently hydrogen or alkyl groups having a carbon number between 1 and 5, and $R_5$ and $R_6$ are independently hydrogen, linear alkyl groups having carbon number between 1 and 5 or annular alkyl groups having a carbon number between 5 and 12.

Examples of this benzyloxycarbonyl derivative are expressed by the following Formula 13.

Formula 13

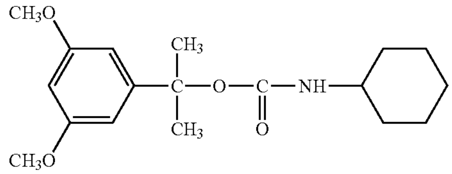

The o-nitrobenzyloxycarbonyl derivative may be a compound expressed by the following Formula 14.

Formula 14

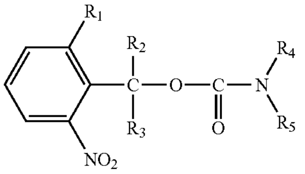

where $R_1$ is hydrogen or a nitro group, $R_2$ and $R_3$ are independently hydrogen or alkyl groups having a carbon number between 1 and 5, and $R_4$ and $R_5$ are independently hydrogen, linear alkyl groups having carbon number between 1 and 5 or annular alkyl groups having a carbon number between 5 and 12.

Examples of this o-nitrobenzyloxycarbonyl derivative may be expressed by the following Formulas 15 to 18.

Formula 15

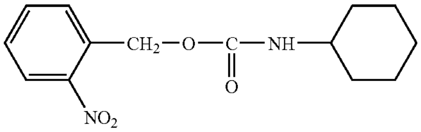

Formula 16

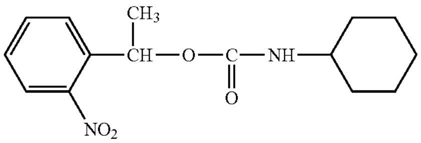

Formula 17

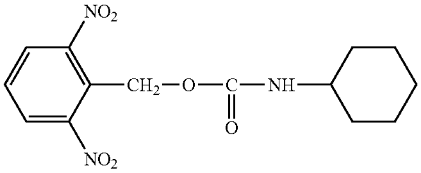

Formula 18

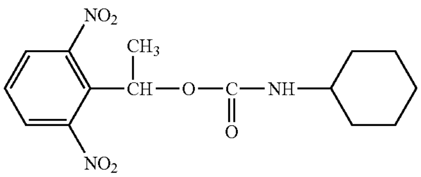

An example of the formamide compound may be expressed by the following Formula 19.

Formula 19

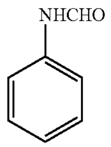

Meanwhile, the epoxy resin may contain a bi-functional epoxy resin and/or a multi-functional epoxy resin. The bi-functional epoxy resin refers to a resin having two epoxy groups, and the multi-functional epoxy resin refers to a resin having at least three epoxy groups. Preferably, the epoxy resin contains both of the bi-functional epoxy resin and the multi-functional epoxy resin.

The bi-functional epoxy resin may be at least one epoxy resin selected from a group consisting of a bisphenol-A type, a bisphenol-F type, a hydroquinone type and a resorcinol type. Further, the multi-functional epoxy resin may be a novolak type epoxy resin.

In particular, the epoxy resin may contain a bisphenol-A diglycydyl ether epoxy resin as the bi-functional epoxy resin and a novolak epoxy resin as the multi-functional epoxy resin. The bisphenol-A epoxy resin is commercially available from SHELL CHEMICAL COMPANY under such tradenames as EPON 828, EPON 1004, EPON 1001F, EPON 1010 and EPON SU-8; from DOW CHEMICAL COMPANY under such tradenames as DER-331, DER-332 and DER-334; and from UNION CARBIDE CORPORATION under such tradenames as ERL-4201, ERL-4289 and ERL-0400. Further, the novolak epoxy resin is commercially available from DOW CHEMICAL COMPANY under such tradenames as DEN-431, DEN-439 and the like.

The epoxy resin may be contained in the range from about 40 to 70% by weight of the total photocurable resin composition. The PBG may be contained in the range from about 5 to 10% by weight. When the epoxy resin contains both of the bi-functional epoxy resin and the multi-functional epoxy resin, the bi-functional epoxy resin may be contained in the range from about 5 to 50% by weight of the total photocurable resin composition, and preferably in the range from about 10 to 20% by weight, and the multi-functional epoxy resin may be contained in the range from about 0.5 to 20% by weight, and preferably in the range from about 1 to 5% by weight.

The non-photo-reactive solvent may be gamma-butyrolactone (GBL), cyclopentanone, C1-6 acetate with a carbon number between 1 and 6, THF (tetrahydrofuran), xylene or mixtures thereof.

Moreover, the photocurable resin composition, preferably, further includes an ethylenically unsaturated compound. The ethylenically unsaturated compound may be an acrylate compound. For example, the acrylate compound may include, but is not limited to, methylmethacrylate, n-butylacrylate, hydroxyethylacrylate, hydroxyethylmethacrylate, n-butylmethacrylate, hydroxypropylacrylate, hydroxypropylmethacrylate and ethylacrylate. Furthermore, it is preferable that the ethylenically unsaturated compound further includes an epoxy group.

In this case, the ethylenically unsaturated compound may be contained in the range from about 1 to 10% by weight of the total photocurable resin composition, and preferably in the range from about 1 to 5% by weight.

Also, the photocurable resin composition may further contain an additive. The additive may be at least one selected from a group consisting of a silane coupling agent to improve adhesion to the substrate, a dye to regulate an absorption coefficient of the photocurable resin layer, a surfactant, a filler and a viscosity modifier. The surfactant is a material capable of improving adhesion between the substrate 10 and the first photocurable resin layer 30, which may be a cationic surfactant, an anionic surfactant or a non-ionic surfactant.

Subsequently, to remove a solvent component contained in the first photocurable resin layer 30 formed on the substrate 10, soft baking is performed at a low temperature, such as, for example, about 80 to 100° C. The baked first photocurable resin layer 30 is subjected to irradiation of light using a photo mask 91 with a flow path pattern 91*a* as a mask, so that the first photocurable resin layer 30 is selectively exposed. For this exposure, the light may be UV (ultraviolet) or DUV (deep ultraviolet) having a wavelength of about 400 nm or less. A light source emitting this light may be, for example, a mercury lamp (365 nm), a KrF laser (248 nm), or an ArF laser (193 nm).

The exposed first photocurable resin layer 30 has an unexposed portion 30" corresponding to the flow path pattern 91*a* and an exposed portion 30' corresponding to a portion other than the flow path pattern 91*a*. The exposed portion 30' allows irradiation of the light to generate a base from the photo-base generator. The generated base reacts with the epoxy group of the epoxy resin to cause ring-opening polymerization. Thus, the epoxy resin is cross-linked to form a first polymer network. As a result, the bi-functional epoxy resin allows the exposed portion 30' of the first photocurable resin layer 30 to improve the tensile strength and the elastomeric properties. Further, the multi-functional epoxy resin allows the exposed portion 30' to increase cross-link density, so that it is possible not only to improve resolution, but also to decrease a solvent swelling property.

Meanwhile, when the photocurable resin composition further includes the ethylenically unsaturated compound, the ethylenically unsaturated compound is cross-linked by the base to thus form a second polymer network. In this case, the first and second polymer networks form an interpenetrating polymer network (IPN). Thus, it is possible to increase cross-link density of the exposed portion 30', chemical resistance against the ink, and hardness. In addition, when the ethylenically unsaturated compound further includes the epoxy group, it is possible to further increase the cross-link density of the exposed portion 30'.

By contrast, the unexposed portion 30" of the first photocurable resin layer 30 remains as a monomer or an oligomer without the epoxy resin and the ethylenically unsaturated cross-linked compound.

The base generated by irradiation of the light does not cause damage to the metal constituting the energy generating element 20 located under the first photocurable resin layer 30. Therefore, the present embodiment, unlike the prior art, is not essentially required to form a passivation layer to protect the energy generating element 20.

Then, one proceeds to a post exposure baking process. The post exposure baking process may be carried out at a temperature between about 60° C. and about 95° C.

Figure 1B:
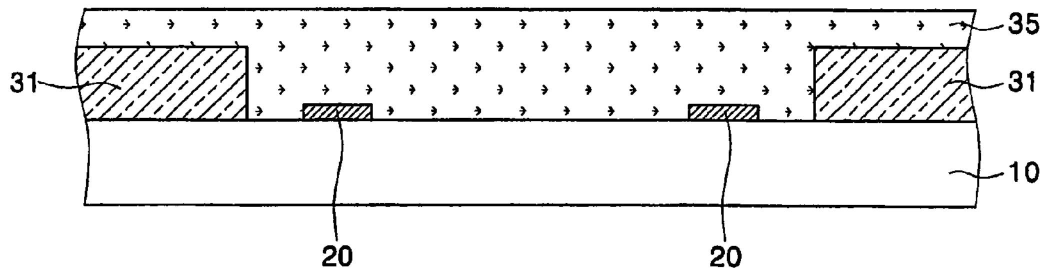

Referring to FIG. 1B, the unexposed portion (30" of FIG. 1A) of the first photocurable resin layer (30 of FIG. 1A) is removed using a developer. Then, a post curing process may be performed to further cure the exposed portion 30' and remove any remaining developer. Thus, a chamber layer 31 is formed on the substrate 10, wherein the chamber layer 31 defines sidewalls of the ink flow path and the ink chamber.

The chamber layer 31 comprises the photocurable composition and includes an epoxy resin and a photo-base generator, thus having effective mechanical strength by high cross-link density, corrosion resistance against the ink, and effective adhesion to the substrate 10.

Next, a sacrificial layer 35 covering the chamber layer 31, i.e., filling the ink flow path and the ink chamber is formed on the substrate 10 with the chamber layer 31. The sacrificial layer 35 may be formed of a positive photoresist.

Figure 1C:
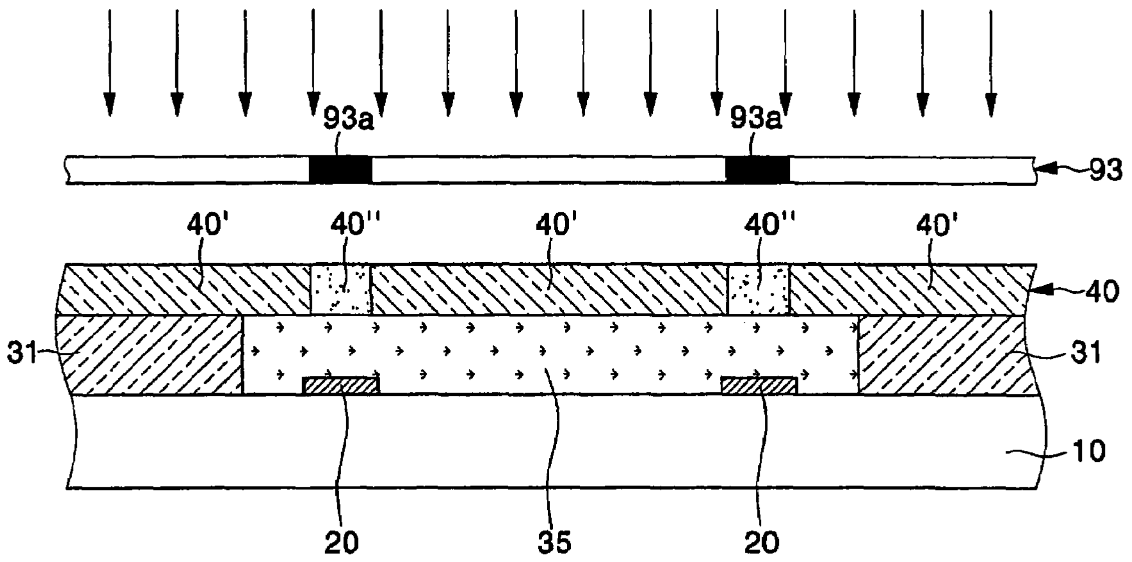

Referring to FIG. 1C, the sacrificial layer 35 is etched to expose a top surface of the chamber layer 31. The sacrificial layer 35 may be etched by a planarizing process, such as a chemical-mechanical polishing (CMP) process. In the process of etching the sacrificial layer 35, the chamber layer 31 may be somewhat reduced in thickness.

Next, a second photocurable resin layer 40 is formed on the chamber layer 31 and the sacrificial layer 35. The second photocurable resin layer 40 may be formed by coating the above-mentioned photocurable resin composition by use of a spin coating method, a roll coating method, or the like. To remove a solvent component contained in the second photocurable resin layer 40, a soft baking process may be performed at a low temperature, for example, about 80 to 100° C. The second photocurable resin layer 40 is selectively exposed by irradiating the light to the baked second photocurable resin layer 40 using a photo mask 93 with a nozzle pattern 93*a* as a mask. Consequently, the exposed second photocurable resin layer 40 has an unexposed portion 40" corresponding to the nozzle pattern 93*a* and an exposed portion 40' corresponding to a portion other than the nozzle pattern 93*a*. The exposed portion 40' is a portion cured by cross-link of the epoxy resin, while the unexposed portion 40" is a portion remaining as a monomer or an oligomer without the cross-linked epoxy resin. Then, one proceeds to a post exposure baking process.

Figure 1D:
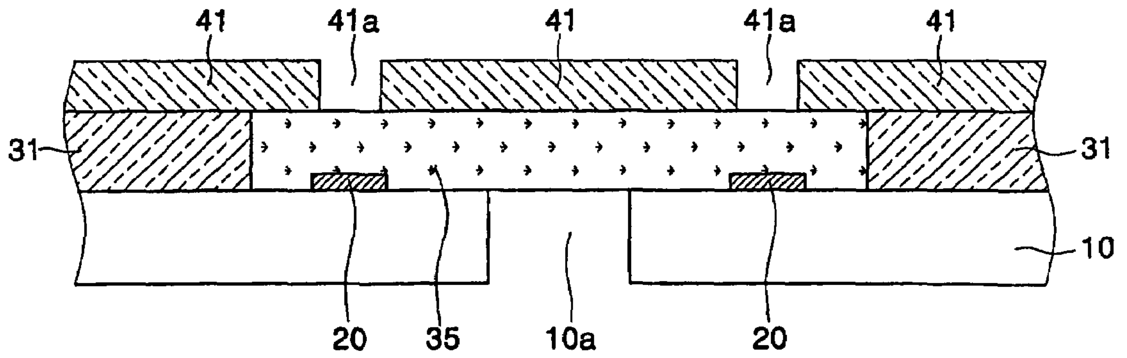

Referring to FIG. 1D, the unexposed portion (40" of FIG. 1C) of the second photocurable resin layer (40 of FIG. 1C) is removed using a developer. Then, a post curing process may be performed to further cure the exposed portion 40' and remove any developer having a chance to remain. Thus, a nozzle layer 41 is formed on the chamber layer 31 and the sacrificial layer 35, wherein the nozzle layer 41 includes nozzles 41*a*. The method of forming the nozzle layer 41 using the photocurable resin composition is similar to the method of forming the chamber layer 31. For this reason, the details of the method of forming the nozzle layer 41 may be obtained by referring to the foregoing method of forming the chamber layer 31.

Alternatively, but not preferably, the nozzle layer 41 may be formed by forming a nozzle plate using a metal material such as nickel by a composite coating process, and then by bonding the nozzle plate with the chamber layer 31.

Subsequently, the substrate 10 is selectively etched to form ink feed hole 10*a* passing through the substrate 10.

Figure 1E:
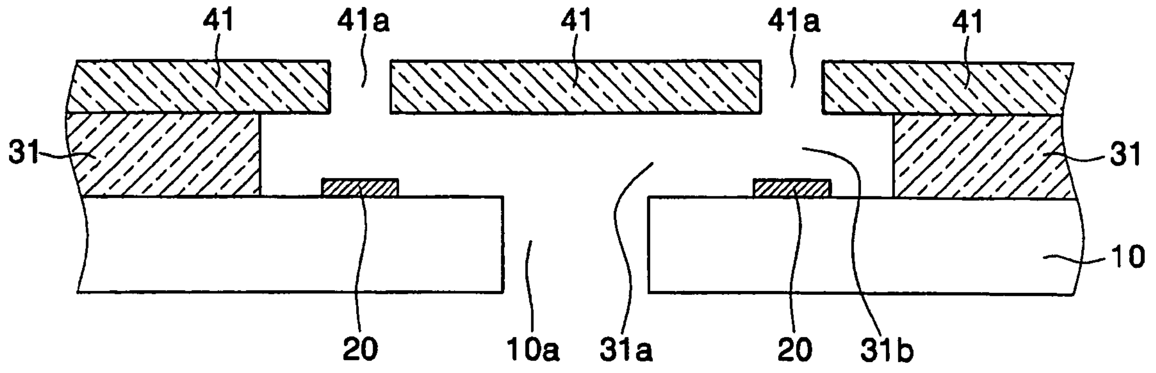

Referring to FIG. 1E, the sacrificial layer (35 of FIG. 1D) is removed through the ink feed hole 10*a* using an appropriate solvent. As a result, an ink flow path 31*a* and an ink chamber 31*b* are formed within a region where the sacrificial layer 35 is removed.

Figure 2A:
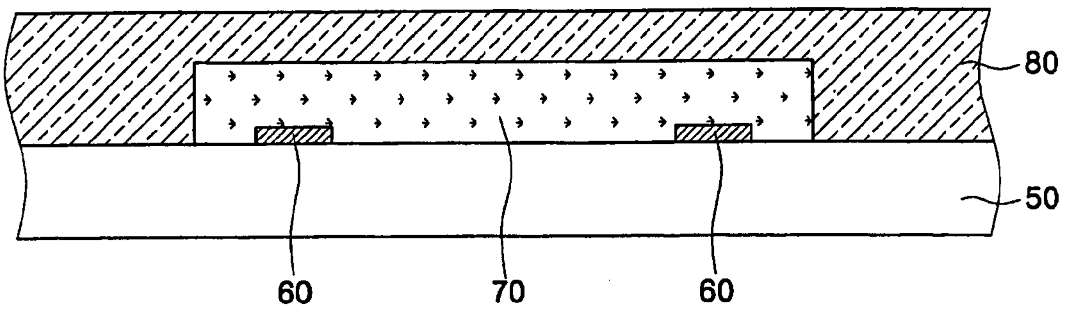
FIGS. 2A to 2C are cross-sectional views illustrating operations of a method of fabricating an inkjet print head according to another embodiment of the present invention.
Figure 2B:
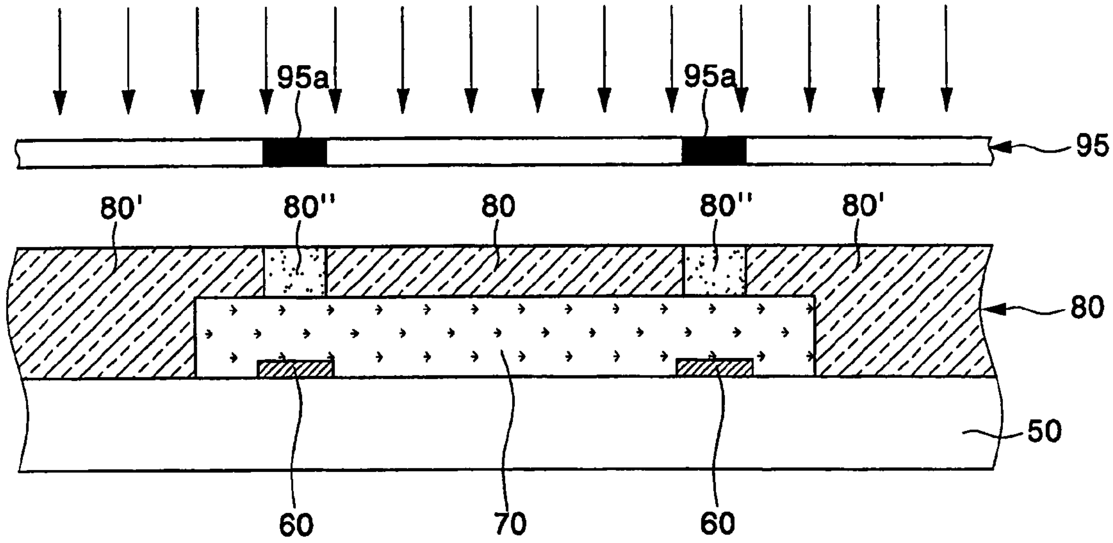
Figure 2C:
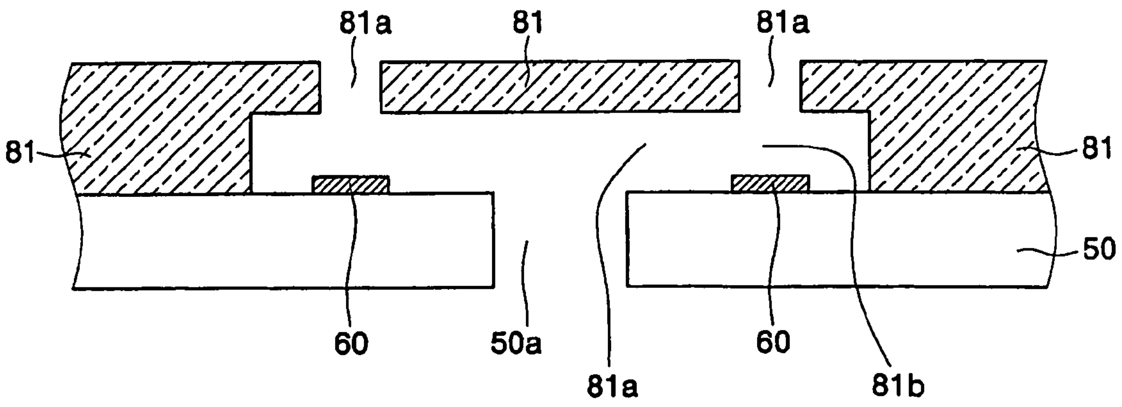

FIGS. 2A to 2C are cross-sectional views illustrating operations of a method of fabricating an inkjet print head according to another embodiment of the present invention. According to the present embodiment, a chamber layer and a nozzle layer are simultaneously formed, unlike the foregoing embodiment.

Referring to FIG. 2A, at least one energy generating element 60 is formed on a base substrate 50. A sacrificial mold layer 70 is formed on the substrate with the energy generating element 60. The sacrificial mold layer 70 may be formed using a positive photoresist.

A photocurable resin layer 80 is formed on the sacrificial mold layer 70 to cover the sacrificial mold layer 70. The photocurable resin layer 80 may be formed by coating a photocurable resin composition on the substrate using a coating method, such as a spin coating method, a roll coating method, or the like. The photocurable resin composition may be the same as that of the above-mentioned embodiment.

Referring to FIG. 2B, the photocurable resin layer 80 is selectively exposed by irradiating the light to the photocurable resin layer 80 using a photo mask 95 with a nozzle pattern 95*a* as a mask. Thus, the photocurable resin layer 80 has an unexposed portion 80" corresponding to the nozzle pattern 95*a* and an exposed portion 80' corresponding to a portion other than the nozzle pattern 95*a*. The exposed portion 80' is a portion cured by cross-linking of the epoxy resin, while the unexposed portion 80" is a portion remaining as a monomer or an oligomer without the cross-linked epoxy resin.

Referring to FIG. 2C, the unexposed portion (80" of FIG. 2B) of the photocurable resin layer (80 of FIG. 2B) is removed using a developer. Thus, there is formed a flow path structure 81 having nozzles 81*a* that correspond to the energy generating elements 60.

Subsequently, the substrate 50 is selectively etched to form ink feed hole 50*a* passing through the substrate 50. The sacrificial mold layer (70 of FIG. 2B) is removed through the ink feed hole 50*a* using an appropriate solvent. As a result, an ink flow path 81*a* and an ink chamber 81*b* are formed within a region where the sacrificial mold layer is removed. The flow path structure 81 is defined by sidewalls of the ink flow path 81*a* the ink chamber 81*b*. Thus, the flow path structure 81 corresponds to the chamber layer (31 of FIG. 1E) and the nozzle layer (41 of FIG. 1E) of the above-mentioned embodiment.

The foregoing embodiments are described with regard to, but not limited to, the inkjet print head of a top shooting type. Thus, it will be apparent from the foregoing embodiments that various flow path structures where the ink flows, namely the flow path structures for the inkjet print head of a bottom shooting type or a side shooting type, may be formed.

The following shows examples of the photocurable resin composition according to one embodiment of the present invention.

EXAMPLE 1 OF THE PHOTOCURABLE RESIN COMPOSITION

The photocurable resin composition according to the present example contained i) 100 parts by weight of epoxy resin (available form DAICEL CHEMICAL industries under the tradename "EHPE-3150"), ii) 2 parts by weight of photo-base generator, O-arcryloyl acetophenone oxime, iii) 20 parts by weight of non-reactive solvent, xylene, iv) 20 parts by weight of surfactant, 1,4-bis(hexafluoro-2-hydroxy-2-propyl)benzene (available from CENTRAL GLASS CO. under the tradename "1,4-HFAB") and v) 5 parts by weight of silane coupling agent (available from NIPPON UNICAR CO. under the tradename "A-187"), and represented a viscosity of 126 cps.

EXAMPLE 2 OF THE PHOTOCURABLE RESIN COMPOSITION

The photocurable resin composition according to the present example contained i) 100 parts by weight of epoxy resin (available form DAICEL CHEMICAL industries under the tradename "EHPE-3150"), ii) 2 parts by weight of photo-base generator, formanilide, iii) 20 parts by weight of non-reactive solvent, methylisobutylketon diethylene glycol dimethyl ether (MIBK-DIGLYME) mixture solvent, iv) 20 parts by weight of surfactant, 1,4-bis(hexafluoro-2-hydroxy-2-propyl)benzene (available from CENTRAL GLASS CO. under the tradename "1,4-HFAB") and v) 5 parts by weight of silane coupling agent (available from NIPPON UNICAR CO. under the tradename "A-187"), and represented a viscosity of 64 cps.

EXAMPLE 3 OF THE PHOTOCURABLE RESIN COMPOSITION

The photocurable resin composition according to the present example contained i) 100 parts by weight of cresol-novolak epoxy resin (available form NIPPON KAYAKU CO. under the tradename "EOCN 102S"), ii) 3 parts by weight of glycidyl methacrylate (available form SIGMA-ALDRICH CORPORATION), iii) 2 parts by weight of photo-base generator, O-arcryloyl acetophenone oxime, iv) 20 parts by weight of non-reactive solvent, xylene and v) 20 parts by weight of surfactant, 1,4-bis(hexafluoro-2-hydroxy-2-propyl)benzene (available from CENTRAL GLASS CO. under the tradename "1,4-HFAB"), and represented a viscosity of 126 cps.

EXAMPLE 4 OF THE PHOTOCURABLE RESIN COMPOSITION

The photocurable resin composition according to the present example contained i) 100 parts by weight of cresol-novolak epoxy resin (available form NIPPON KAYAKU CO. under the tradename "EOCN 102S"), ii) 3 parts by weight of glycidyl methacrylate (available form SIGMA-ALDRICH CORPORATION), iii) 2 parts by weight of photo-base generator, formanilide, iv) 20 parts by weight of non-reactive solvent, methylisobutylketon diethylene glycol dimethyl ether (MIBK-DIGLYME) mixture solvent, and v) 20 parts by weight of surfactant, 1,4-bis(hexafluoro-2-hydroxy-2-propyl)benzene (available from CENTRAL GLASS CO. under the tradename "1,4-HFAB"), and represented a viscosity of 64 cps.

As may be seen from the foregoing, according to the present invention, the chamber layer and/or the nozzle layer are formed using the photocurable resin composition containing the photo-base generator and the epoxy resin. Therefore, the chamber layer and/or the nozzle layer are formed having an effective mechanical strength, a high corrosion resistance against the ink and good adhesion to the substrate caused by high cross-link density.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of fabricating an inkjet print head, comprising: forming at least one energy generating element to eject ink on a substrate; and forming a chamber layer and a nozzle layer on the substrate, the nozzle layer having a nozzle corresponding to the energy generating element, wherein at least one of the chamber layer and the nozzle layer is formed using a photocurable resin composition that includes a photo-base generator, an epoxy resin and a non-photoreactive solvent and wherein the photocurable resin composition is photocurable at a wavelength of about 400 nm or less, wherein the photo-base generator is at least one compound selected from the group consisting of cobalt-amine salts, alkyl amine salts, O-acyloximes, benzyloxycarbonyl derivatives, o-nitrobenzyloxycarbonyl derivatives and formamides, wherein the photocurable resin composition further includes an ethylenically unsaturated compound, wherein the cobalt-amine salt compound is expressed by Formula 1 as follows: $Co(NH_2R)_5X^2+$, where X is a halogen, and R is a hydrogen or an alkyl group having a carbon number of 2, 4 or 5, wherein the benzyloxycarbonyl compound is expressed by Formula 12 as follows:

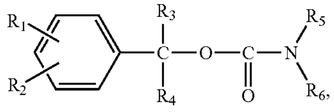

where $R_1$ and $R_2$ are independently hydrogen, $R_3$ and $R_4$ are alkyl groups having a carbon number between 1 and 5, and $R_5$ and $R_6$ are linear alkyl groups having a carbon number between 1 and 5 or annular alkyl groups having a carbon number between 5 and 12, wherein the epoxy resin contains at least one of a bi-functional epoxy resin and a multi-functional epoxy resin, and wherein the photocurable resin composition further includes an ethylenically unsaturated compound.

2. The method as set forth in claim 1, wherein the bifunctional epoxy resin is at least one epoxy resin selected from a group consisting of a bisphenol-A type, a bisphenol-F type, a hydroquinone type and a resorcinol type.

3. The method as set forth in claim 1, wherein the multi-functional epoxy resin is a novolak type epoxy resin.

4. The method as set forth in claim 1, wherein the epoxy resin contains a bisphenol-A diglycydyl ether epoxy resin and a novolak epoxy resin.

5. The method as set forth in claim 1, wherein the ethylenically unsaturated compound includes an epoxy group.

6. The method as set forth in claim 1, wherein forming at least one of the chamber layer and the nozzle layer using the photocurable resin composition further includes: forming a photocurable resin layer on the substrate using the photocurable resin composition; selectively exposing the photocurable resin layer; and removing an unexposed portion of the exposed photocurable resin layer.

7. The method as set forth in claim 1, further comprising, before forming the nozzle layer; forming a sacrificial layer covering the chamber layer; and etching the sacrificial layer to expose a top surface of the chamber layer, wherein the nozzle layer is formed on the chamber layer having the top surface exposed.

8. The method as set forth in claim 7, further comprising, after forming the nozzle layer: etching the substrate to form an ink feed hole passing through the substrate; and removing the sacrificial layer through the ink feed hole.

9. The method as set forth in claim 1, wherein forming at least one of the chamber layer and the nozzle layer includes: forming a sacrificial mold layer covering the energy generating element; forming a photocurable resin layer covering the sacrificial mold layer using the photocurable resin composition; selectively exposing the photocurable resin layer; and removing an unexposed portion of the exposed photocurable resin layer to form a flow path structure having the nozzle corresponding to the energy generating element.

10. The method as set forth in claim 9, further comprising, after forming the flow path structure: etching the substrate to form an ink feed hole passing through the substrate; and removing the sacrificial mold layer through the ink feed hole.

11. A method of fabricating an inkjet print head, comprising:

forming at least one energy generating element for ejecting ink on a substrate; and forming a chamber layer and a nozzle layer on the substrate, the nozzle layer having a nozzle corresponding to the energy generating element, wherein at least one of the chamber layer and the nozzle layer is formed using a photocurable resin composition containing a photo-base generator, an epoxy resin, an ethylenically unsaturated compound and a non-photoreactive solvent, wherein the photocurable resin composition is photocurable at a wavelength of about 400 nm or less, wherein the photo-base generator is at least one compound selected from the group consisting of cobalt-amine salts, alkyl amine salts, O-acyloximes, benzyloxycarbonyl derivatives, o-nitrobenzyloxycarbonyl derivatives and formamides, wherein the photocurable resin composition further includes an ethylenically unsaturated compound, wherein the cobalt-amine salt compound is expressed by Formula 1 as follows: $Co(NH_2R)_5X^{2+}$, where X is a halogen, and R is a hydrogen or an alkyl group having a carbon number of 2, 4 or 5, and wherein the benzyloxycarbonyl compound is expressed by Formula 12 as follows:

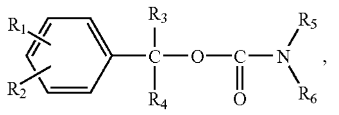

where $R_1$ and $R_2$ are independently hydrogen, $R_3$ and $R_4$ are alkyl groups having a carbon number between 1 and 5, and $R_5$ and $R_6$ are linear alkyl groups having a carbon number between 1 and 5 or annular alkyl groups having a carbon number between 5 and 12, wherein the epoxy resin contains at least one of a bi-functional epoxy resin and a multi-functional epoxy resin, and wherein the ethylenically unsaturated compound includes an epoxy group.

* * * * *